Sept. 4, 1962   J. F. KIRKBRIDE   3,052,092
SOLID PROPELLANT ROCKET MOTOR
Filed March 30, 1959

INVENTOR.
JOHN F. KIRKBRIDE
BY *Homer O. Blair*

ATTORNEY

United States Patent Office 3,052,092
Patented Sept. 4, 1962

3,052,092
SOLID PROPELLANT ROCKET MOTOR
John F. Kirkbride, Kirkland, Wash., assignor to Boeing Airplane Company, Seattle, Wash., a corporation of Delaware
Filed Mar. 30, 1959, Ser. No. 802,940
6 Claims. (Cl. 60—35.6)

This invention relates to rocket motors and, more particularly, to solid propellant rocket motors.

In general, the thrust of a rocket is equal to the product of the mass flow rate and the effective exhaust velocity. If a large thrust is desired, the mass flow rate must be large. A large mass flow rate can be achieved by the use of a large burning surface, a high burning rate, or a combination of these factors.

Since a given combustion chamber is able to hold only a specified amount of propellant, the variation of thrust for any specific propellant has to be obtained by varying the shape of the charge or "grain" and, therefore, the exposed burning surface. A number of shapes have been utilized, including those known as a cigarette or end burner, the internal star configuration, the internal burning multiperforated configuration, singular unit hollow charge tubular configuration, etc.

One difficulty that has occurred with various shapes of charges is due to the fact that the thrust may not be constant over the life of the combustion cycle. The configuration which is most useful in providing a constant thrust is that known as the cigarette or end burner in which a solid, cylindrically-shaped charge or grain is burned from one end only. As the combustion normally proceeds at a smooth rate in a direction normal to the burning surface, the cigarette shaped charge is consumed evenly with a constant burning surface and with a constant thrust. However, in the past, the end burning configuration has been useful for low thrust only because, if a high burning rate material were used, the casing of the rocket motor would be unduly heated which would lead to failure. If a material with a low burning rate were used, it would frequently be satisfactory in the end burning configuration, but would provide only low thrust. Also with other shapes which use internal burning, ordinarily a low burning rate fuel must be used because with the larger burning area a high burning rate fuel will not provide sufficient burning time.

In general, my invention provides an end burning configuration in which the casing is protected until the rocket motor is burned out, yet constant thrust with a high burning rate, and therefore a high thrust, is provided.

It is an object of this invention to provide an improved rocket motor.

It is another object of this invention to provide an improved solid propellant rocket motor.

It is an additional object to provide an improved end burning solid propellant rocket motor.

It is a further object to provide an improved solid propellant rocket motor using a plurality of solid propellant members.

It is an auxiliary object to provide an improved end burning solid propellant rocket motor in which a plurality of solid propellant members are used so that the rocket motor casing is protected from unduly high temperatures.

These and other objects of this invention will be apparent from the following description, taken in accordance with the accompanying drawing, throughout which like reference characters indicate like parts, which drawing forms a part of this application and in which.

Figure 1:
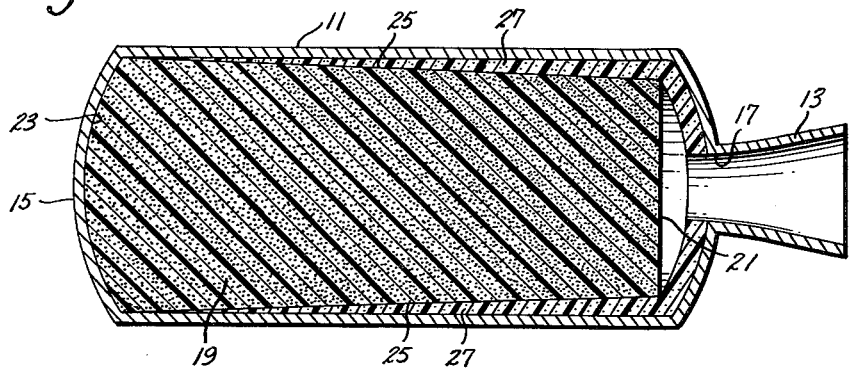
FIG. 1 is a side sectional view of one embodiment of my invention.

In general, my invention involves the use of a first solid propellant member which has a comparatively high burning rate and which is substantially enclosed by a second solid propellant member having a lower burning rate. The lower burning rate enclosing propellant member in effect protects the rocket casing from high temperatures until the entire propellant charge is consumed.

My invention uses principles which keep the low burning rate enclosing propellant from being consumed near any particular part of the motor casing until the higher burning rate propellant has been itself consumed. For example, in FIG. 1, there is shown a rocket motor casing 11 which includes an opening at one end, which, in this case, is in the form of a nozzle 13, including a nozzle throat 17. The opposite end 15 of the motor casing 11 is closed. A first solid propellant member 19 is positioned within the motor casing 11, and, in this particular embodiment, includes a first end surface 21, a second end surface 23, and an intermediate external surface 25 between the respective end surfaces. As can be seen, the first end surface 21 is adjacent the opening of the nozzle 13 of the motor casing 11. A second propellant member 27 encloses the first propellant member 19 and acts, in effect, as a barrier between the first propellant member 19 and the motor casing 11.

In order to provide for sufficiently high thrust, the first propellant member 19 should be composed of a propellant having a suitable high burning rate. However, in order to provide adequate protection for the motor casing 11, the second propellant member 27 should have a suitable low burning rate. Also, as this particular embodiment shows an end burning configuration, the portion of the second propellant member 27 which is adjacent the nozzle 13 of the motor casing 11 should be thick enough so that the motor casing is protected until the entire first propellant member 19 has been consumed. As the first propellant member 19 is ignited by an igniter (not shown) adjacent the nozzle 13 and burns toward the closed end 15 of the motor casing 11, different portions of the second propellant member 27 will not be ignited until they are exposed to an area of combustion. Therefore, the portions of the second propellant member 27 which are located toward the closed end 15 of the motor casing 11 will not be ignited until later in the burning life of the first propellant and therefore will not have to burn as long in order to provide adequate protection for the motor casing 11. Therefore, as shown in FIG. 1, I have provided that the portion of the second propellant member 27 which is adjacent the nozzle 13 is to be thicker than the other portions of the second propellant member 27, and this thickness decreases as the distance from the nozzle increases, or stated in another manner, the closer the portion of the second propellant member 27 is to the nozzle 13, the greater its thickness. It can be seen that this thickness and the rate of increase in the thickness can be readily adjusted in accordance with the relative burning rates of the propellants.

Also, as shown in FIG. 1, it may be desirable to have the second propellant member 27 extend along the motor casing 11 all the way to the nozzle throat 17 in order to protect the part of the motor casing 11 which is adjacent the nozzle throat 17. However, it should be noted that the first end surface 21 of the first propellant member 19 is spaced from that portion of the second propellant member 27 which is adjacent the nozzle throat 17 in order to form a substantially planar burning surface upon ignition.

It is usually not necessary to have a portion of second propellant member 27 cover the second end surface 23 of the first propellant member 19, as that surface will be the last to burn and the motor casing will be exposed to high temperatures for only a short time at the end of the burning cycle. Of course, in some instances, it may be desirable to protect the second end surface 23 of the first propellant member 19 with a portion of the second propellant member 27, or possibly by other means, such as a thermal insulating material, which may be satisfactory for a short time.

In general, many propellants may be used depending on various factors such as availability, cost, storage, safety, toxicity, burning rate, etc. Suitable solid propellants are discussed in the book "Solid Propellant Rockets" by A. J. Zaehringer, published by the American Rocket Company of Wyandotte, Michigan, 1955. The composition of certain particular propellants is disclosed on page 61 of Zaehringer, and are discussed in general in many portions of the book. Another book which discloses suitable solid propellants is "Rocket Propulsion Elements" by George P. Sutton, Wiley & Sons, New York, second edition, 1956. In particular, on page 315 of Sutton, there are charts showing the burning rates of various solid propellants. For example, an asphalt-perchlorate propellant has a burning rate of approximately 1.0 inch per second at a pressure of 1000 pounds per square inch at an ambient temperature of 68 F. This asphalt-perchlorate propellant would be suitable for use as the high burning rate first propellant member 19. Also, as shown on page 315 of Sutton, a composite ammonium nitrate propellant has a burning rate of approximately 0.085 inch at a pressure of 1000 pounds per square inch at an ambient temperature of 60° F. This composite ammonium nitrate propellant would be suitable for the low burning rate second propellant member 27. In general, the burning rates of propellants vary over comparatively wide ranges, on the order of between 0.03 to 2.5 inches per second, at reasonable chamber pressures. My invention, of course, is not limited to any particular propellants, but any suitable propellants with proper burning rates may be used.

Figure 2:
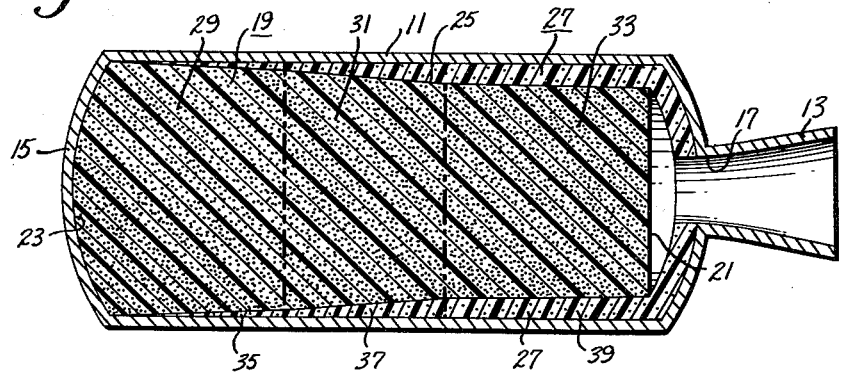
FIG. 2 is a side sectional view of another embodiment of my invention.

In some instances it may be desirable to use a first propellant member 19 having zones with different burning rates such as shown in FIG. 2. FIG. 2 is similar to FIG. 1 except that the first propellant member 19 includes a first zone 29, a second zone 31, and a third zone 33. Each of these zones may have a burning rate different from its adjacent zone, and all are higher than the burning rates of the various portions of the second propellant member 27. Also, the second propellant member 27 includes a first portion 35, a second portion 37, and a third portion 39. It can be seen that the thickness of the various portions of the second propellant member 27 change at different rates, which is dependent in an inverse fashion upon the burning rates of the adjacent zone of the first propellant member 19. Also, in some instances, it may be desirable to vary the burning rates of portions of the second propellant member and maintain a constant change of thickness. It is also possible in some instances to utilize my invention with configurations other than end burning charges in which certain portions of the first propellant member are hollowed out or pierced or varied in other manners. Also, of course, it is not necessary to use a strictly cylindrically configuration.

While the present invention has been shown in a few forms only, it will be obvious to those skilled in the art that it is not so limited, but is susceptible of various changes and modifications without departing from the spirit and scope thereof.

I claim as my invention:

1. A solid propellant rocket motor, including a metallic motor casing having an opening at one end, a first solid propellant member positioned within said casing, and a second solid propellant member substantially enclosing said first propellant member and being positioned between said first propellant member and said casing, said first propellant member being exposed to said opening, the thickness of said second propellant member increasing as it approaches said opening, the propellant material of said first propellant member having a higher burning rate than the propellant material of said second propellant member.

2. An end-burning solid propellant rocket motor, including a metallic motor casing having an opening at one end, a first solid propellant member positioned within said casing, said first propellant member having an end surface adjacent said opening, and a second solid propellant member substantially enclosing and being contiguous with said first propellant member, said first propellant end surface being free from contact with said second propellant member, the thickness of said second propellant member increasing as it approaches said opening, the propellant material of said first propellant member having a higher burning rate than the propellant material of said second propellant member.

3. An end-burning solid propellant rocket motor, including a metallic motor casing having an opening at one end, a substantially cylindrical first solid propellant member positioned within said casing, said first propellant member having a first end surface, a second end surface and an external surface between said end surfaces, said first end surface being adjacent said opening, and a second solid propellant member enclosing and being contiguous with said first propellant external surface, the thickness of said second propellant member increasing as it approaches said opening, the propellant material of said first propellant member having a higher burning rate than the propellant material of said second propellant member.

4. An end-burning solid propellant rocket motor, including a metallic motor casing having an opening at one end, a substantially cylindrical first solid propellant member positioned within said casing, said first propellant member having a first end surface, a second end surface and an external surface between said end surfaces, said first end surface being adjacent said opening, and a second solid propellant member enclosing and being contiguous with said first propellant external surface, said first end surface and said second end surface being free from contact with second propellant member, the thickness of said second propellant member increasing as it approaches said opening, the propellant material of said first propellant member having a higher burning rate than the propellant material of said second propellant member.

5. A solid propellant rocket motor, including a metallic motor casing having an opening at one end, a first solid propellant member positioned within said casing, and a second solid propellant member substantially enclosing said first propellant member and being positioned between said first propellant member and said casing, said first propellant member being exposed to said opening, said first propellant member being composed of a plurality of propellant zones, with each zone including propellants having a different burning rate from the propellant of the adjacent zone, the propellant material of each of said zones having a higher burning rate than the propellant material of said second propellant member, the thickness of said second propellant member increasing as it approaches said opening.

6. A solid propellant rocket motor, including a metallic motor casing having an opening at one end, a first solid propellant member positioned within said casing, and a second solid propellant member substantially enclosing said first propellant member and being positioned between said first propellant member and said casing, said first propellant member being exposed to said opening, said first propellant member being composed of a plurality of propellant zones, with each zone including propellants having a different burning rate from the propellant of the adjacent zone, the propellant material of each of said zones having a higher burning rate than the propellant material of said second propellant member, the thickness of second propellant member increasing as it approaches said opening, the rate of increase of the thickness of a portion of said second propellant member varying inversely in accordance with the burning rates of the propellant material of the propellant zone of said first propellant member which is adjacent said portion of said second propellant member.

References Cited in the file of this patent

UNITED STATES PATENTS

| | | |
|---|---|---|
| 1,074,809 | Newton | Oct. 7, 1913 |
| 1,920,075 | Haenichen | July 25, 1933 |
| 2,524,591 | Chandler | Oct. 3, 1950 |

OTHER REFERENCES

Astronautics, March 1958, pages 26–28, 48 and 49 relied on.